US007224701B2

(12) United States Patent
Ozguner

(10) Patent No.: US 7,224,701 B2
(45) Date of Patent: *May 29, 2007

(54) METHOD AND APPARATUS FOR IMPLEMENTING FRAME HEADER ALTERATIONS USING BYTE-WISE ARITHMETIC LOGIC UNITS

(75) Inventor: Tolga Ozguner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1007 days.

This patent is subject to a terminal disclaimer.

(21) Appl. No.: 10/185,556

(22) Filed: Jun. 27, 2002

(65) Prior Publication Data

US 2004/0001486 A1    Jan. 1, 2004

(51) Int. Cl.
*H04J 3/16* (2006.01)
*H04L 12/28* (2006.01)
(52) U.S. Cl. .................. 370/471; 370/389; 370/412; 370/503
(58) Field of Classification Search ............ 712/204, 712/207, 22, 203, 206, 208, 209, 210, 212, 712/221, 215; 370/389, 392, 396, 503, 471
See application file for complete search history.

(56) References Cited

U.S. PATENT DOCUMENTS 5,669,010 A * 9/1997 Duluk, Jr. ................ 712/22
5,859,992 A * 1/1999 Tran et al. ................ 712/204
6,085,311 A * 7/2000 Narayan et al. ........... 712/204
6,731,652 B2 * 5/2004 Ramfelt et al. ............ 370/489

OTHER PUBLICATIONS

U.S. Appl. No. 185,552, filed Jun. 27, 2002, entitled "Method and Apparatus for Implementing Frame Header Alterations".
U.S. Appl. No. 180,993, filed Jun. 27, 2002, entitled "Method and Apparatus for Implementing Alterations on Multiple Concurrent Frames".

* cited by examiner

*Primary Examiner*—Hanh Nguyen
(74) *Attorney, Agent, or Firm*—Joan Pennington

(57) ABSTRACT

A method and apparatus are provided for implementing frame header alterations using byte-wise arithmetic logic units (ALUs). First and second stage alteration engines include a plurality of first stage byte-wise arithmetic logic units (ALUs). Each ALU includes inputs for receiving frame data, command data, register data, and commands, and register data and data outputs. The first and second stage byte-wise ALUs respectively perform the received first and second stage commands and the second stage ALUs provide altered frame data output. The commands enable operations such as load, add, and, or, move, and the like used by the two-stages of byte-wise ALUs forming the alteration engines to perform the alterations or combine new header data into a stream of frame data.

15 Claims, 8 Drawing Sheets

ETHERNET FRAME FORMAT 300    PRIOR ART

PACKET OVER SONET FORMAT 310    PRIOR ART

METHOD AND APPARATUS FOR IMPLEMENTING FRAME HEADER ALTERATIONS USING BYTE-WISE ARITHMETIC LOGIC UNITS

FIELD OF THE INVENTION

The present invention relates generally to the data processing field, and more particularly, relates to a method and apparatus for implementing frame header alterations using byte-wise arithmetic logic units (ALUs).

RELATED APPLICATIONS

Related United States patent applications by the present inventor and assigned to the present assignee are being filed on the same day as the present patent application including:

U.S. patent application Ser. No. 10/180,993, entitled "METHOD AND APPARATUS FOR IMPLEMENTING ALTERATIONS ON MULTIPLE CONCURRENT FRAMES"; and U.S. patent application Ser. No. 10/185,552, entitled "METHOD AND APPARATUS FOR IMPLEMENTING FRAME HEADER ALTERATIONS".

DESCRIPTION OF THE RELATED ART

One of the main functions of a network processor is to take incoming packets or frames, and perform alterations on the headers for the purpose of implementing certain network protocols as required by a particular application. These alterations can be done in a core processor, but they can often be time consuming and result in high latency and failure to meet the bandwidth requirements of the application.

A higher performance alternative is to have designated logic to perform alterations on frames as instructed by the core processor. In this scenario, a frame or packet comes into the chip, is classified according to its contents, and depending on the software load, dispatched to a frame alteration unit (FAU) with a list of alterations to be performed. The FAU in turn reads the frame or packet data from storage, applies the necessary alterations, and sends the data back out to the network or to another chip in the system for further processing or routing.

Limited speed or the required time to perform the frame alterations remains a significant problem with known frame alteration arrangements. Also known frame alteration arrangements typically are restricted to predefined alterations, lacking the flexibility required to perform frame alterations in a wide variety of protocols and multiple alteration formats that currently exist or that will be developed in the future.

SUMMARY OF THE INVENTION

A principal object of the present invention is to provide a method and apparatus for implementing frame header alterations using byte-wise arithmetic logic units (ALUs). Other important objects of the present invention are to provide such method and apparatus for implementing frame header alterations using byte-wise arithmetic logic units (ALUs) substantially without negative effect and that overcome many of the disadvantages of prior art arrangements.

In brief, a method and apparatus are provided for implementing frame header alterations using byte-wise arithmetic logic units (ALUs). First stage alteration engines sequentially receive aligned frame data, first stage commands and first stage command data and provide altered frame data outputs responsive to the received first stage commands. Second stage alteration engines are coupled to outputs of the first stage alteration engines. The second stage alteration engines sequentially receive altered frame data outputs of the first stage alteration engines, second stage commands and second stage command data and provide final altered frame data. The first stage alteration engines and second stage alteration engines include a plurality of byte-wise arithmetic logic units (ALUs). Each ALU includes inputs for receiving frame data, command data, register data, and commands and data and register data outputs. Each first stage ALU performs a respective first stage received command and each second stage ALU performs a respective second stage received command.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
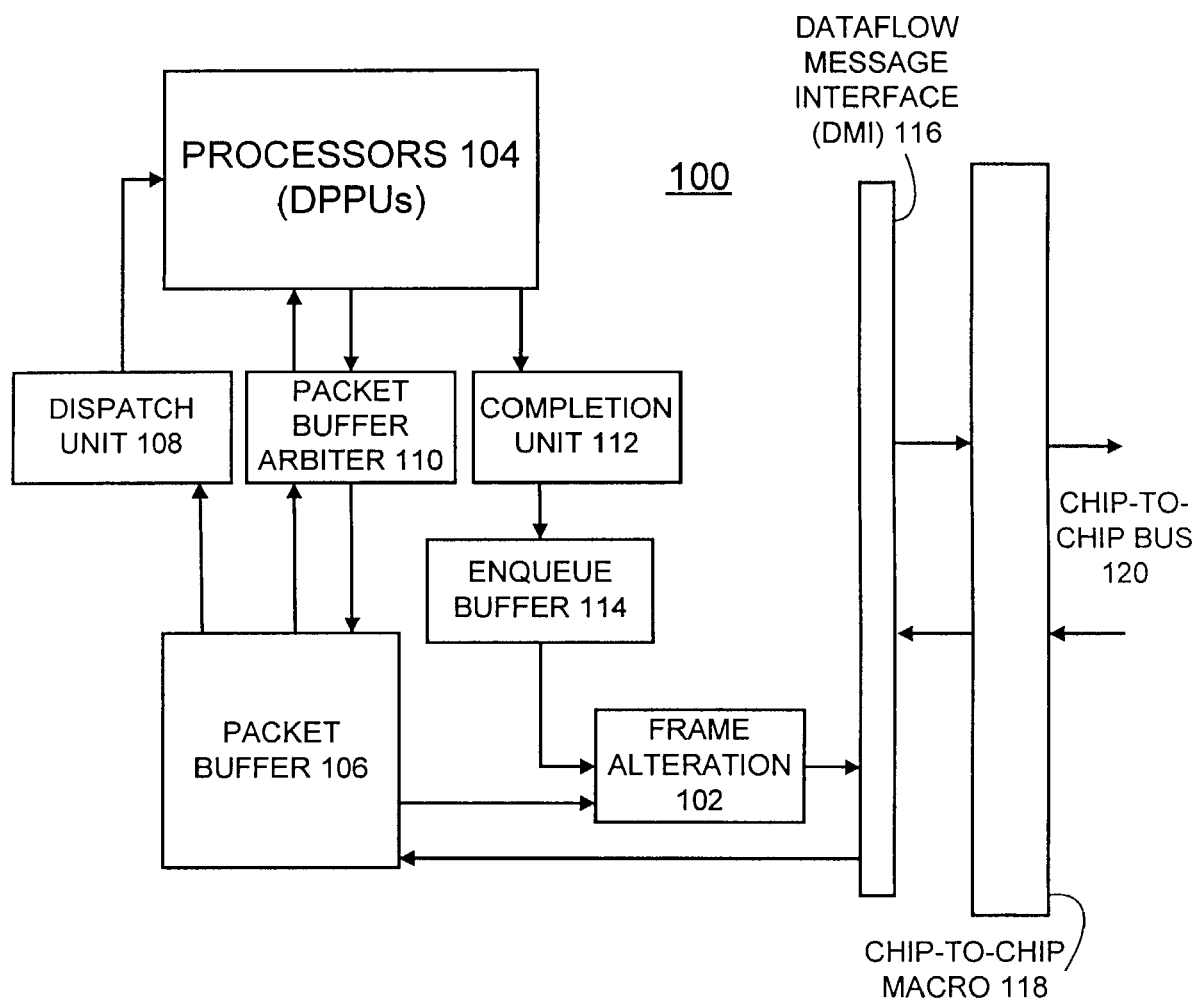
FIG. 1 is block diagram illustrating a data and storage network processor including a frame alteration unit (FAU) in accordance with the preferred embodiment.

Having reference now to the drawings, in FIG. 1, there is shown a data and storage network chip or network processor 100 including a frame alteration unit (FAU) 102 in accordance with the preferred embodiment. Network processor 100 is shown in simplified form sufficient for understanding the present invention.

Network processor 100 includes a plurality of processors 104, such as distributed pico processor units (DPPUs), and a packet buffer 106 coupled to the processors or DPPUs 104 by a dispatch unit 108 and a packet buffer arbiter 110. The packet buffer 106 receives and stores incoming packet data or frames in an on-chip array, builds descriptors for the frames, and then queues the frames for processing by the processors or DPPUs 104. The dispatch unit 108 sends the frame descriptors to the processors or DPPUs 104. Processors or DPPUs 104 can access packet buffer data via the packet buffer arbiter 110. The packet buffer arbiter 110 has access to all of the memory locations inside of the packet buffer 106. Processors or DPPUs 104 can alter a frame by going through the packet buffer arbiter 110 into the packet buffer 106 and work with the frame in the on-chip array within the packet buffer 106. However, altering the frame in this way can be time consuming.

In accordance with the preferred embodiment, processors or DPPUs 104 create and send frame alteration (FA) commands to the frame alteration unit 102 facilitating faster frame alterations. Once a particular DPPU 104 creates the FA commands, the DPPU sends the frame descriptors along with the FA commands to the frame alteration unit 102 via a completion unit 112, and an enqueue buffer 114. Frame alteration unit 102 receiving the frame descriptors and FA commands, performs frame alterations and sends the altered frame via a dataflow message interface (DMI) 116 and chip-to-chip macro 118 to a chip-to-chip bus 120.

Figure 2A:
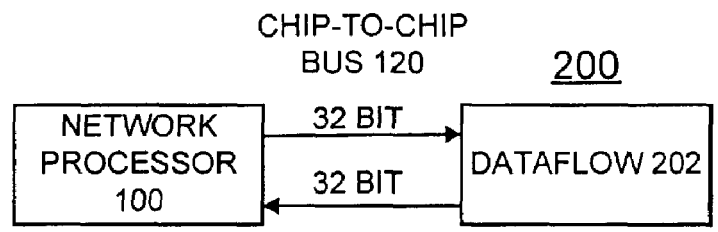
FIGS. 2A, 2B, and 2C are diagrams illustrating exemplary multiple point-to-point bus configurations of the data and storage network processor of FIG. 1 in accordance with the preferred embodiment.
Figure 2B:
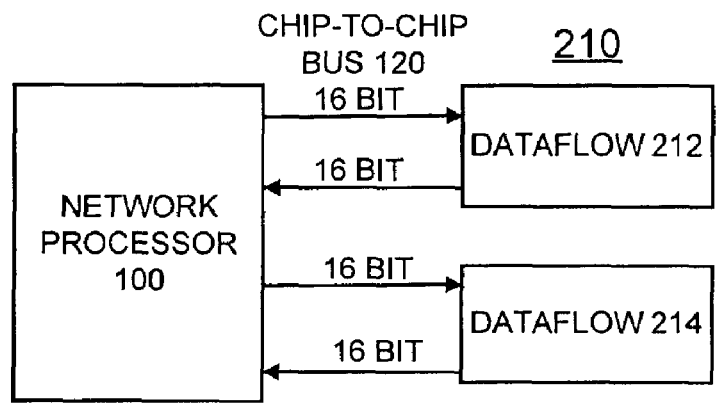
Figure 2C:
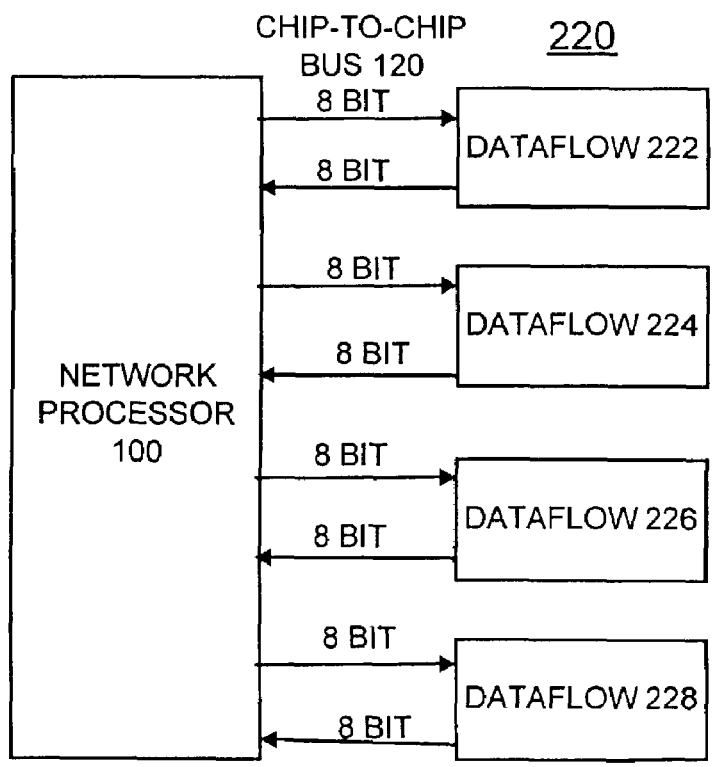

Referring now to FIGS. 2A, 2B, and 2C, exemplary multiple programmable point-to-point bus configurations of the 32-bit chip-to-chip bus 120 selectively configured in various combinations of a 32-bit, 16-bit or 8-bit busses of the data and storage network processor 100. FIG. 2A illustrates a first configuration generally designated by 200 of the network processor 100 with the chip-to-chip bus 120 configured as 32-bit bus for a single destination dataflow 202. FIG. 2B illustrates a second configuration generally designated by 210 of the network processor 100 with the chip-to-chip bus 120 configured as 16-bit busses for a pair of independent dataflows 212 and 214. FIG. 2C illustrates a third configuration generally designated by 220 of the network processor 100 with the chip-to-chip bus 120 configured as 8-bit busses for four independent dataflows 222, 224, 226, and 228.

In accordance with features of the preferred embodiment, frame alteration unit 102 has high performance capability, for example, to perform frame alterations at a rate of 16 GB/s. Frame alteration unit 102 has the ability to dynamically provide more bandwidth to destinations with higher bandwidth requirements. Frame alteration unit 102 has the ability to perform alterations on 4 frames concurrently in order to minimize inter frame latency in a high bandwidth application as shown in FIG. 2A, or to provide lower bandwidth for two or four destinations as shown in FIGS. 2B and 2C.

Frame alteration unit 102 operates in two major modes including a full-bus mode and split-bus mode. Frame alteration unit 102 operates in full-bus mode with a single destination for the frames with a high bandwidth requirement, for example, 16 GB/s. Frame alteration unit 102 operates in split-bus mode with either two or four independent destinations for frames, each with either one-half the bandwidth requirement for two destinations, for example, 8 GB/s, or one-quarter the bandwidth requirement for four destinations, for example, 4 GB/s.

Figure 3A:
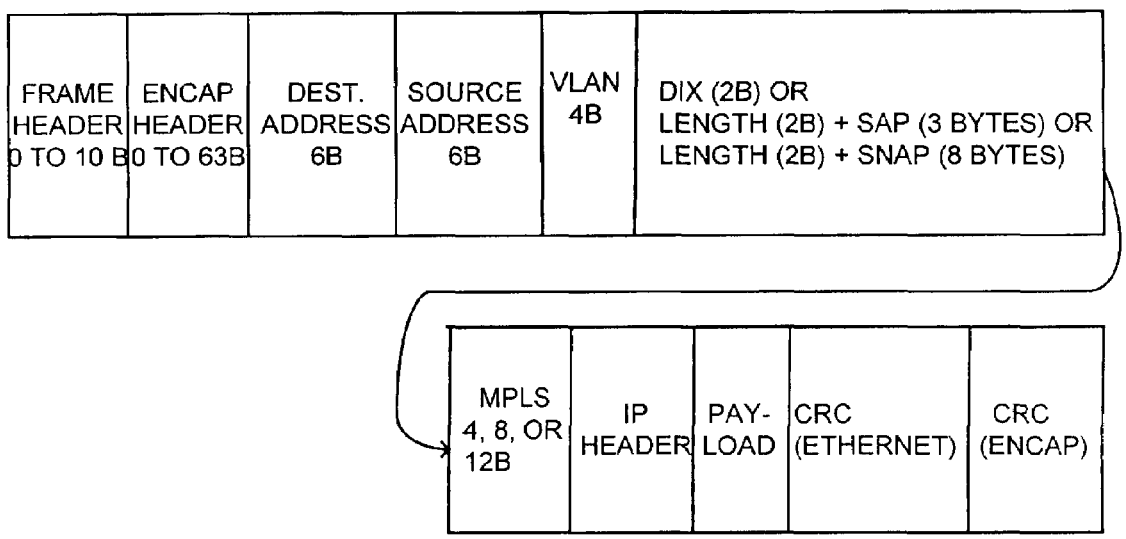
FIGS. 3A and 3B are diagrams respectively illustrating a conventional format of an Ethernet frame and Packet over Sonet (POS) packet that include multiple header fields that can be changed, inserted or deleted using the frame alteration unit (FAU) in accordance with the preferred embodiment.
Figure 3B:
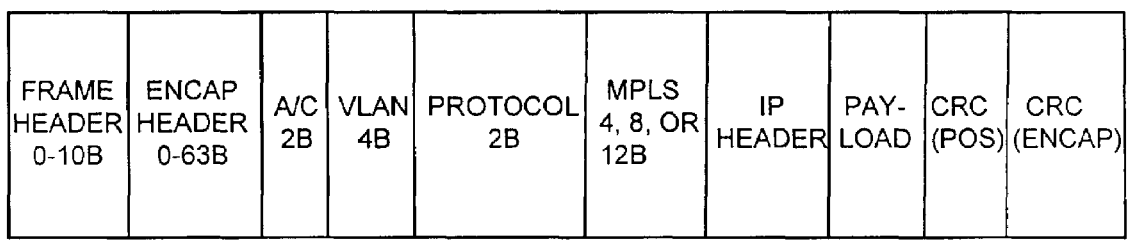

FIGS. 3A and 3B respectively illustrate a conventional format of an Ethernet frame generally designated 300 and Packet over Sonet (POS) packet generally designated 310 that include multiple header fields that can be changed, inserted or deleted using the frame alteration unit 102 in accordance with the preferred embodiment.

Figure 4:
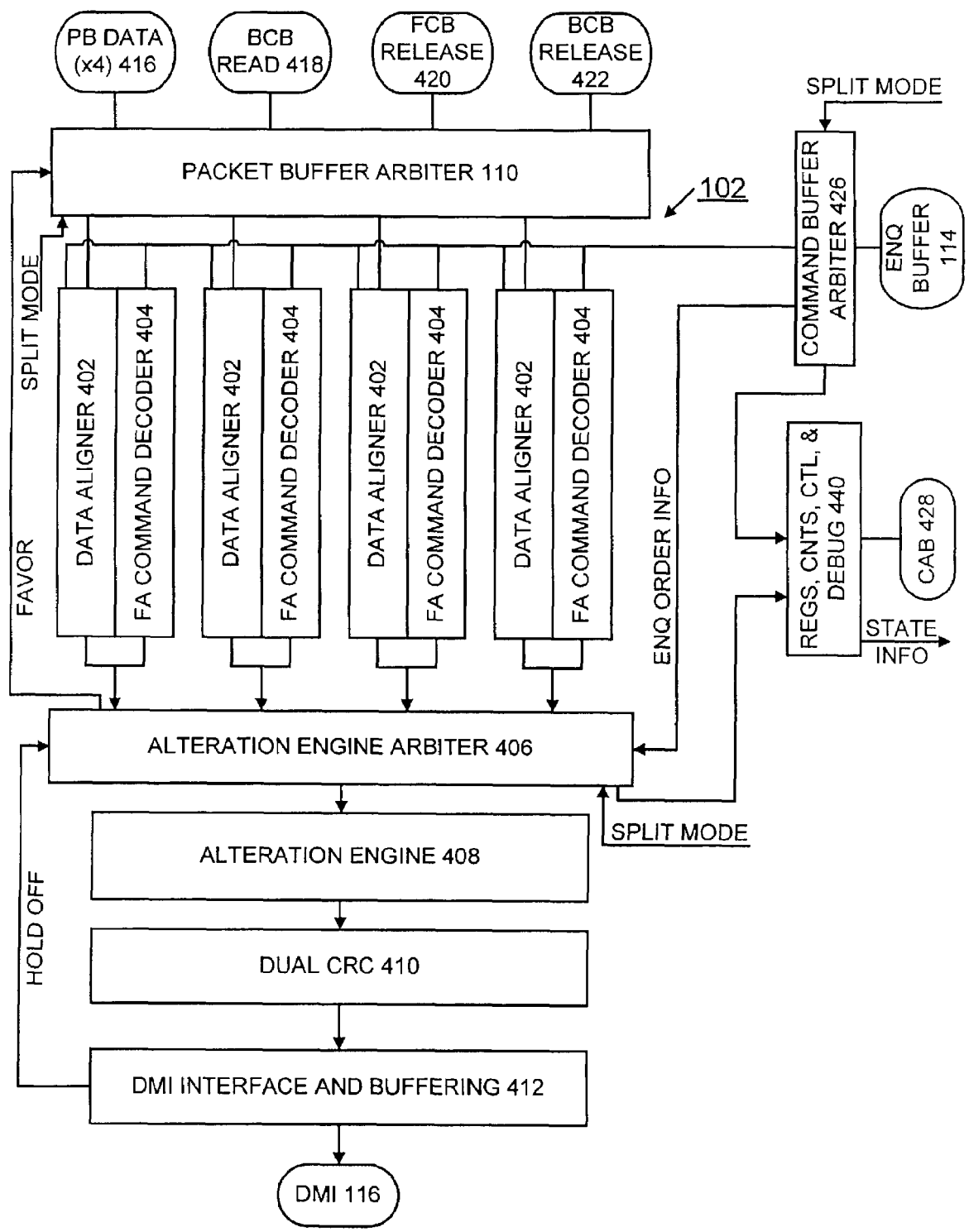
FIGS. 4 and 5 are block diagrams illustrating a frame alteration unit (FAU) of the data and storage network processor of FIG. 1 in accordance with the preferred embodiment.

Referring now to FIG. 4, frame alteration unit 102 includes a plurality of pairs of a data aligner 402 and a frame alteration (FA) command decoder 404 coupled to an alteration engine arbiter 406. The packet buffer arbiter 110 is coupled to each of the four data aligners 402 providing packet buffer data. Frame alteration unit 102 includes an alteration engine 408 coupled to a dual cyclic redundancy check (CRC) block 410 and a dataflow message interface (DMI) and buffering block 412. Interconnects to the frame alteration unit 102 are shown in oval shapes.

The dataflow message interface (DMI) 116 is coupled to the DMI and buffering block 412. A packet buffer (PB) data 416, a buffer control block (BCB) read 418, a frame control block (FCB) release 420, and a BCB release 422 are coupled to the packet buffer arbiter 110. The enqueue buffer 114 is coupled to a command buffer arbiter 426. The command buffer arbiter 426 is coupled to each of the data aligners 402 and the frame alteration command decoders 404 providing FA commands and frame descriptors. A control access bus (CAB) interface 428 is coupled to configuration registers, counts, control, and debug logic 430 that provides state information. A split mode control signal indicated at lines labeled SPLIT MODE is applied the packet buffer arbiter 110, command buffer arbiter 426, and alteration engine arbiter 406. DMI and buffering block 412 applies a timing control signal to the alteration engine arbiter 406 indicated at a line labeled HOLDOFF. Command buffer arbiter 426 applies an enqueue control signal to the alteration engine arbiter 406 indicated at a line labeled ENQUEUE ORDER INFO. The alteration engine arbiter 406 applies a control signal to the packet buffer arbiter 110 indicated at a line labeled FAVOR.

Figure 5:
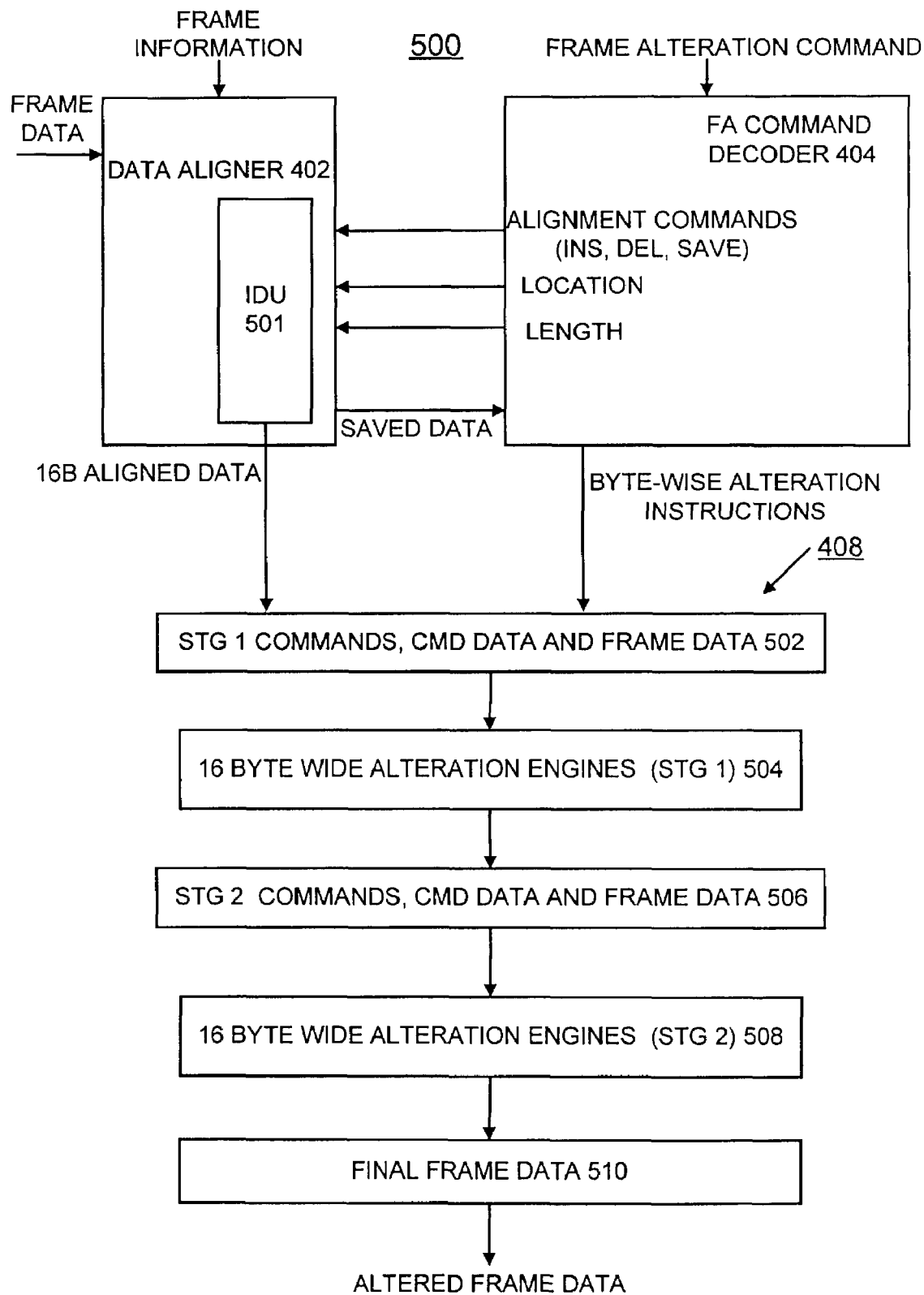

Referring also to FIG. 5, data aligner 402 receives frame information and frame data from packet buffer 106 in segments of 1 to 64 bytes each transfer, concatenates the frame data together, and realigns the frame data to make space for data inserts or remove data for deletes as instructed by the FA command decoder 404. At its output, the data aligner 402 provides 16 bytes (16B) of aligned data per cycle. FA command decoder 404 decodes the commands sent to the frame alteration unit 102, and provides individual inserts and delete instructions to the data aligner 402 indicated at a line ALGINMENT COMMANDS (INS, DEL, SAVE). A position and length of each insert and delete instruction also is provided by FA command decoder 404 to the data aligner 402. There can be multiple inserts and deletes per frame, for example, six inserts and deletes per frame depending on the type of headers the frame needs. Data aligner 402 provides save data to the FA command decoder 404 indicated at a line labeled SAVE DATA including a portion of one or more deletes per frame that is needed for providing the required final frame data, for example, to provide an updated time-to-live (TTL) value.

Data aligner 402 includes an insertion and deletion unit (IDU) 501 receiving the inserts and delete instructions together with the position and length from the FA command decoder 404 and 16B frame data per cycle. IDU 501 provides 16B of aligned frame data per cycle to the alteration engine 408. Alteration engine 408 includes a first stage commands, command data and frame data registers 502 receiving first and second stage aligned data per cycle from the data aligner IDU 501 and first and second stage byte-wise aligned data per cycle from the data aligner IDU 501 and byte-wise alteration instructions from the FA command decoder 404. Alteration engine 408 includes a first stage of 16 byte wide alteration engines 504 having input coupled to the first stage commands, command data and frame data registers 502 and an output coupled to a second stage commands, command data and frame data registers 506. Alteration engine 408 includes a second stage of 16 byte wide alteration engines 508 having input coupled to the second stage commands, command data and frame data registers 506 and an output coupled to a final frame data registers 510 providing the altered frame data.

FA command decoder 404 also provides byte-wise alteration instructions, such as 32 byte-wise micro commands, each cycle to the alteration engine 408. FA command decoder 404 also provides the operands for these commands. The micro commands enable operations such as load, add, and, or, move, and the like used by the two-stage byte-wise alteration engines 504 and 508 forming the alteration engine 408 to actually perform the alterations or combine new header data into the stream of frame data. The micro commands can be used to load in value of fields that were inserted using the IDU 501, overlay values to certain fields, increment or decrement fields, as well as numerous other frame alterations commonly used in networking protocols. As with the IDU 501, these alteration engines 504 and 508 provide the flexibility to work with a variety of protocols, with the command decoder 404 providing the alteration commands for both the IDU 501 and the alteration engines 504 and 508.

Figure 6:
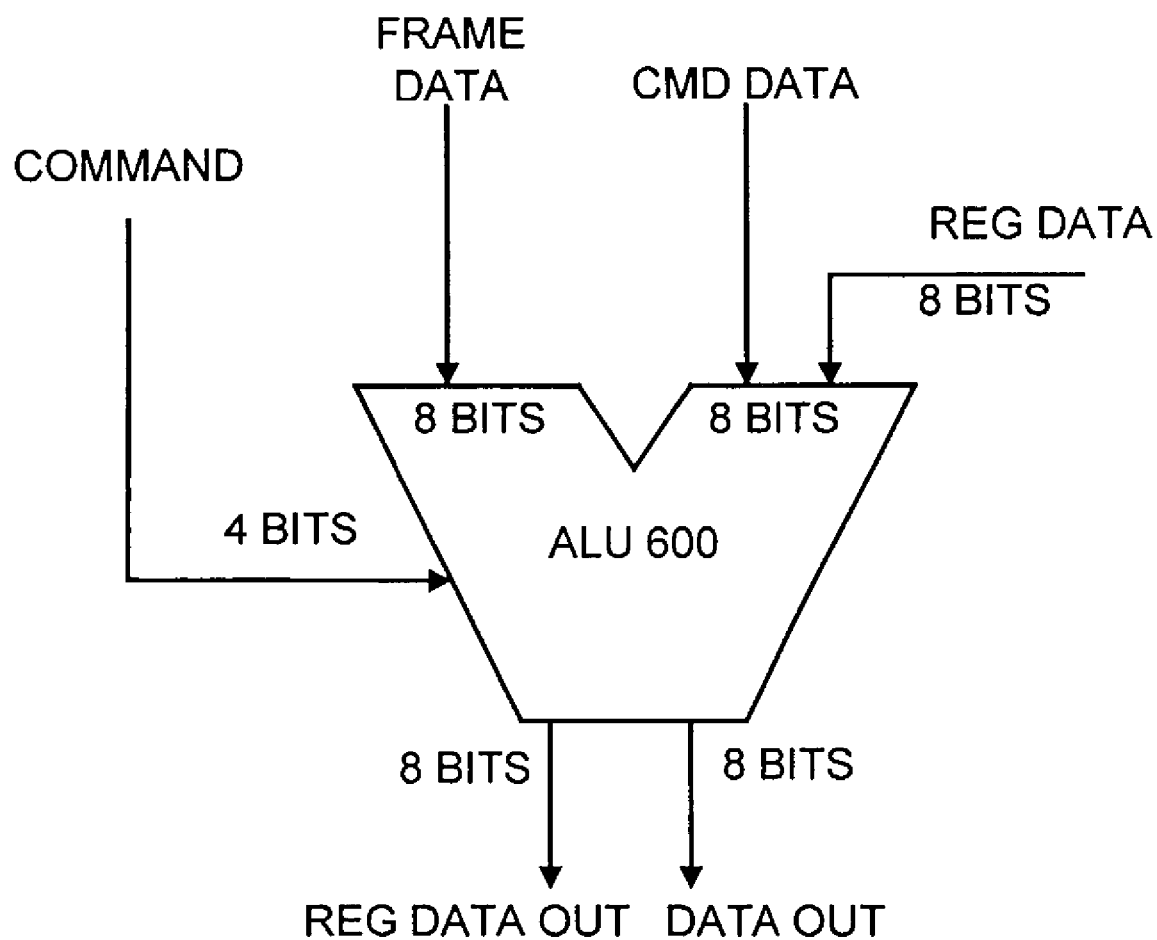
FIG. 6 is a diagram illustrating an arithmetic logic unit (ALU) of a frame alteration engine of the frame alteration unit (FAU) of the data and storage network processor of FIG. 1 in accordance with the preferred embodiment.

Referring now to FIG. 6, there is shown an arithmetic logic unit (ALU) generally designated by 600 of a frame alteration engine 408 in accordance with the preferred embodiment. ALU 600 receive frame data, command data, and register data, each 8-bits and 4-bit commands and provides 8-bit register data and data outputs.

In accordance with features of the preferred embodiment, a collection of 1-byte Arithmetic Logic Units (ALUs) 600 are used to implement the alteration engine 408 including sixteen byte wide alteration engines 504 and 508 for networking protocols, both present and future. Advantages of the alteration engine 408 including sixteen byte wide alteration engines 504 and 508 are the overall simplicity through commonality, the flexibility, and speed. Given the proper commands, the collection of ALUs 600 can perform a wide variety of alterations. Given the simple nature of each ALU, an optimized ALU can be clocked at high frequencies. The ALUs are multiply declared for the appropriate data width.

A single ALU 600 can perform the following commands:

Load that Overlays Frame Data with Cmd Data and is used for setting fields to predetermined value;

Logical And that logically ANDs Frame Data with Cmd Data; Logical Or that logically ORs Frame Data with Cmd Data;

Add that Adds Cmd Data to Frame Data and Carry Out is on Reg Data Out;

Add to Register that is the same as above Add except the output goes to a register;

Save that saves a byte for use in a different location in the frame, and the Frame data is sent to a register, potentially specified in Cmd Data;

Load from Register that Overlays Frame Data with Reg Data and different registers can potentially be selected through the Cmd Data field;

Add from Register that adds Reg Data to Frame Data. Different registers can potentially be selected through the Cmd Data field.

Also, the above two Load from Register and Add from Register have bypass versions or bypass Load from Register and bypass Add from Register, such that the register data is from the input of the register for cases where data needs to be forwarded from data later in the frame. It should be understood that the ALU 600 is not limited to the above-listed commands, other commands could be performed by the ALU 600.

Figure 7:
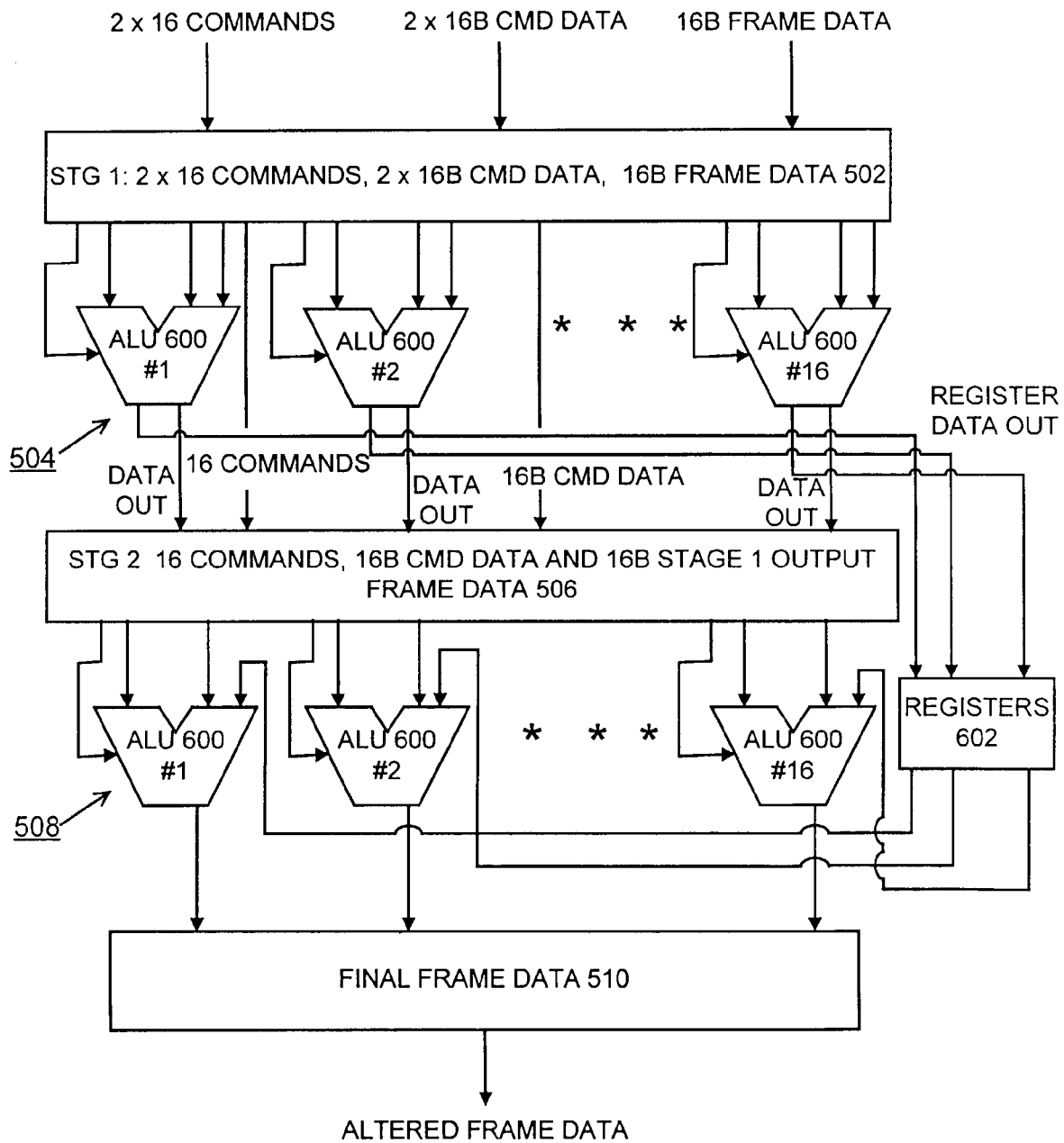
FIG. 7 is a diagram illustrating the frame alteration engine of the frame alteration unit (FAU) of the data and storage network processor of FIG. 1 in accordance with the preferred embodiment.

Referring now to FIG. 7, there is shown alteration engine 408 in accordance with the preferred embodiment including ALUs 600 that are arranged into a larger alteration unit. As shown, alteration engine 408 includes two stages of commands, command data and frame data registers 502 and 506 and the byte-wise alteration engines 504 and 508, each including sixteen ALUs #1–16, 600. It should be understood that the frame alteration engine 408 is not limited to the illustrated arrangement; for example, there is not a logical restriction on the width.

Stage 1 commands, command data and frame data registers 502 are arranged to receive and store 2×16 commands, 2×16B command data, and 16B frame data. Stage 2 commands, command data and frame data registers 506 are arranged to receive and store 16 commands and 16B command data coupled from the stage 1 registers 502, and 16B frame data provided at the outputs of the sixteen stage 1 ALUs 600. Additional registers 602 are coupled between the stage 1 and stage 2 byte-wise alteration engines 504 and 508. Register data outputs of the sixteen stage 1 ALUs #1–16, 600 of alteration engines 504 are coupled to registers 602. Registers 602 provide register data inputs to the sixteen stage 2 ALUs #1–16, 600 of alteration engines 508.

Data aligners 402 and FA command decoders 404 are responsible for providing properly formatted data 16B of formatted data per cycle and creating the appropriate commands. For example, the FA command decoder 404 decodes FA commands for various operations, such as overlaying a new Ethernet destination addresses and providing a series of six consecutive load commands to six ALUs 600 of the stage 1 byte-wise alteration engines 504 with the data being the destination address. Changing certain bits anywhere in the frame involves, for example, AND commands for selected ones of the ALUs 600 of the first stage byte-wise alteration engines 504 together with OR commands for the selected ones of the ALUs 600 of the second stage byte-wise alteration engines 504. Various TTL operations can be performed with an ADD command. MPLS TTL operations can be done using save and load operations, and the like.

In a multi-protocol label switching (MPLS) network, incoming packets are assigned a label by a label edge router (LER). Packets are forwarded along a label switch path (LSP) where each label switch router (LSR) makes forwarding decisions based solely on the contents of the label. At each hop, the LSR strips off the existing label and applies a new label which tells the next hop how to forward the packet. Label Switch Paths (LSPs) are established by network operators for a variety of purposes, such as to guarantee a certain level of performance to route around network congestion, or to create IP tunnels for network-based virtual private networks. In many ways, LSPs are similar to circuit-switched paths in ATM or Frame Relay networks, except that LSPs are not dependent on particular Layer 2 technology. An LSP can be established that crosses multiple Layer 2 transports such as ATM, Frame Relay or Ethernet. Thus, one of the true promises of MPLS is the ability to create end-to-end circuits, with specific performance characteristics, across any type of transport medium, eliminating the need for overlay networks or Layer 2 only control mechanisms.

Frame alteration unit 102 can be used to perform MPLS, LER and LSR functionally within the network processor 100 to perform changes to the MPLS packet at peak performance instead of going through conventional long software paths.

Frame alteration unit 102 also provides a flexible approach to implement unforeseen MPLS uses by allowing the capability to deal with multiple labels and all fields within a label.

Figure 8:
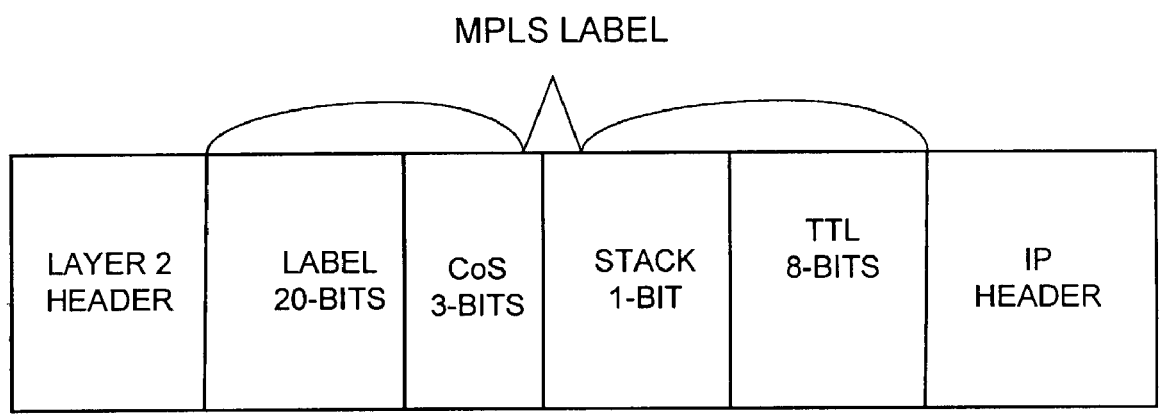
FIG. 8 is a diagram illustrating a conventional label format of a Multi-Protocol Label Switching (MPLS) packet that includes multiple fields that can be changed, inserted or deleted using the frame alteration unit (FAU) in accordance with the preferred embodiment.

Referring now to FIG. 8, a conventional Label format of a Multi-Protocol Label Switching (MPLS) packet that includes multiple fields that can be changed, inserted or deleted using the frame alteration unit 102 in accordance with the preferred embodiment. The 32-bit MPLS Label is located after the Layer 2 header and before the IP header. As shown in FIG. 8, the MPLS Label contains multiple fields including a label field of 20-bits that carries the actual value of the MPLS Label; a CoS field of 3-bits that can affect the queuing and discard algorithms applied to the MPLS packet as it is transmitted through the network; a 1-bit Stack field that supports a hierarchical label stack and a TTL (time-to-live) field of 8-bits that provides conventional IP TTL functionality.

When entering an MPLS network, the LER typically inserts one MPLS Label between the Layer 2 and Layer 3 headers. Frame alteration unit 102 supports the insertion of multiple MPLS labels. The TTL field within the labels is copied from the IP TTL field. This is an MPLS label insertion. An LSR will typically remove the old label, and replace it with a new label. The TTL is decremented, the CoS bit can be changed and the S bit is usually preserved. This is an MPLS label swap. When leaving the MPLS network, all remaining MPLS labels will be removed. The TTL field will be copied back from the top MPLS label to the IP TTL field. This is an MPLS label delete.

Frame alteration unit 102 can perform multiple MPLS label inserts, deletes and swaps, with the option of changing or preserving the CoS, stack and TTL fields as well as the 20-bit label.

MPLS alterations commands are applied to the FA command decoder 404 of the FAU 102. The DPPUs 104 in the network processor 100 generates the MPLS alterations commands. The commands specify what sort of MPLS alterations need to be performed (inserts, swaps or deletes), the number of labels to be swapped, inserted or deleted (or a combination of swaps with inserts or deletes), what to do with the TTL, S-bit and CoS fields, label data, and the locations of the Layer 2 and Layer 3 headers.

The FA command decoder 404 decodes the MPLS alterations commands into a collection of insert/delete/save commands for the IDU 501. The commands given to the IDU 501 have the following 3 forms: 1.) Insert, Location, Length that is used for MPLS pushes and can support any number of MPLS labels; 2.) Delete, Location, Length that is used for MPLS Pops; and 3.) Save, Location that is used for a byte-wise save of either old MPLS TTLs before they are deleted, an IP TTL, or IPv4 checksums if updating is needed.

IDU 501 provides aligned data with the proper formatting. Deleted data is removed and space is provided for inserted data. IDU 501 will also provide the FA command decoder 404 with a saved data, such as the MPLS TTL, if necessary. The IDU output 16B of aligned data is applied to the alteration engines 504, 508.

FA command decoder 404 provides the alteration engines 504, 508 with the proper byte-wise alteration commands to perform the necessary alteration commands. For inserting labels, FA command decoder 404 provides the label data. Using either the save function of the IDU 501 or the save and load functions of the alteration engines 504, 508, the IP TTL is copied to the MPLS TTL if necessary.

For an MPLS Swap, FA command decoder 404 gives the alteration engines 504, 508 load commands for the swapped label, and a combination of AND and OR commands to change or preserve the CoS or stack fields. The TTL field can be decremented using the Aes ADD command or loaded in if desired.

For the MPLS Pop, FA command decoder 404 receive the popped TTL from the IDU 501, then the popped TTL is provided into the proper location using a LOAD command to one of the alteration engines 504, 508. The TTL can be decremented in alteration engines 508 with an ADD command. If the final MPLS label was popped, then FA command decoder 404 can place the TTL into the IP TTL field in the same way. In the case of an IPv4 packet, the incremental checksum update can be calculated either using the alteration engine ADD commands, or calculated internally in the FA command decoder 404 using the IDU save data and then loaded into the proper location.

While the present invention has been described with reference to the details of the embodiments of the invention shown in the drawing, these details are not intended to limit the scope of the invention as claimed in the appended claims.

What is claimed is:

1. Apparatus for implementing frame header alterations in a network processor comprising:

a frame alteration command decoder and frame alignment input stage receiving incoming packet frame data and frame information and frame alignment commands and providing a sequential output of a predetermined number of bytes of aligned frame data, and frame header alteration commands, first stage alteration engines coupled to said frame alteration command decoder and frame alignment input stage, said first stage alteration engines sequentially receiving said predetermined number of bytes of aligned frame data, said frame header alteration commands including first stage commands, and first stage command data and providing sequential altered frame data outputs;

second stage alteration engines coupled to said first stage alteration engines, said second stage alteration engines sequentially receiving said altered frame data outputs of said first stage alteration engines, said frame header alteration commands including second stage commands and second stage command data and providing final sequential altered frame data; and each of said first stage alteration engines and second stage alteration engines including a plurality of byte-wise arithmetic logic units (ALUs) for performing respective first stage received commands and respective second stage received commands, each of said plurality of byte-wise ALU including inputs for receiving frame data, command data, register data, and commands, and including data and register data outputs.

2. Apparatus for implementing frame header alterations in a network processor as recited in claim 1 includes first stage registers coupled to said first stage alteration engines sequentially receiving aligned frame data and alteration instructions; said alteration instructions including said first and second stage commands and said command data.

3. Apparatus for implementing frame header alterations in a network processor as recited in claim 2 includes second stage registers coupled to said first stage registers and said plurality of first stage byte-wise ALUs sequentially receiving said altered frame data outputs of said first stage byte-wise ALUs, second stage commands and second stage command data.

4. Apparatus for implementing frame header alterations in a network processor as recited in claim 2 includes third registers coupled to said plurality of first stage byte-wise ALUs sequentially receiving said first stage register data outputs of said first stage ALUs and coupling said first stage register data outputs to said register data inputs of said second stage ALUs.

5. Apparatus for implementing frame header alterations in a network processor as recited in claim 1 wherein said first and second stage commands include at least one selected command of load, logical and, logical or, add, add to register, save, load from register, add from register, bypass load from register, and bypass add from register.

6. Apparatus for implementing frame header alterations in a network processor as recited in claim 1 wherein said frame alteration command decoder and frame alignment input stage includes a command decoder receiving and decoding frame alteration commands and providing said frame alignment commands; said frame alignment commands including at least one of insert, delete and save and a position and length of each said at least one of insert, delete and save.

7. Apparatus for implementing frame header alterations in a network processor as recited in claim 6 further includes a data aligner receiving frame data and coupled to said command decoder receiving said frame alignment commands; said data aligner including an insert and delete unit sequentially receiving a predefined number of bytes of frame data, selectively latching data bytes of said received frame data responsive to said frame alignment commands and sequentially providing said aligned frame data output of said predefined number of bytes; said aligned frame data output selectively including one or more inserts, and one or more deletes; and said data aligner selectively providing save frame data to said command decoder responsive to said frame alignment commands.

8. Apparatus for implementing frame header alterations in a network processor as recited in claim 1 wherein said predetermined number of bytes of aligned frame data, first stage commands, and first stage command data sequentially received by first stage alteration engines includes sixteen bytes of aligned frame data, sixteen first stage commands, and sixteen bytes of command data.

9. Apparatus for implementing frame header alterations in a network processor as recited in claim 8 wherein said frame data outputs of first stage alteration engines, second stage commands and second stage command data and providing final altered frame data sequentially received by said second stage alteration engines includes sixteen bytes of frame data outputs of said first stage alteration engines, sixteen second stage commands, and sixteen bytes of second stage command data.

10. Apparatus for implementing frame header alterations in a network processor as recited in claim 9 wherein each of said first stage alteration engines and said second stage alteration engines include sixteen byte-wise arithmetic logic units (ALUs).

11. A method for implementing frame header alterations in a network processor including a plurality of distributed pico processor units (DPPUs) generating frame alteration commands coupled to a frame alteration unit, said method comprising the steps of:

decoding frame alteration commands and providing frame alignment commands and alteration instructions; said alteration instructions including first and second stage commands and first and second stage command data; said frame alignment commands including at least one of insert, delete and save and a position and length of each said at least one of insert, delete and save;

receiving incoming packet frame data and frame information and said frame alignment commands and providing a sequential output of a predetermined number of bytes of aligned frame data, said sequential output of a predetermined number of byes of aligned frame data selectively including one or more inserts, and one or more deletes;

sequentially applying said predetermined number of bytes of said aligned frame data, said first stage commands, and said first stage command data to first stage alteration engines and providing first stage sequential altered frame data outputs;

sequentially applying first stage altered frame data outputs of said first stage alteration engines, said second stage commands and said second stage command data to second stage alteration engines for providing final sequential altered frame data; and providing a plurality of byte-wise arithmetic logic units (ALUs) for forming each of said first stage alteration engines and second stage alteration engines, said byte-wise ALUs for performing respective first stage received commands and respective second stage received commands, each of said plurality of byte-wise ALU including inputs for receiving frame data, command data, register data, and commands, and including data and register data outputs.

12. A method for implementing frame header alterations in a network processor as recited in claim 11 wherein the step of providing a plurality of byte-wise arithmetic logic units (ALUs) for forming each of said first stage alteration engines and said second stage alteration engines includes providing sixteen byte-wise ALUs for forming each of said first stage alteration engines and second stage alteration engines.

13. A method for implementing frame header alterations in a network processor as recited in claim 12 wherein the step of sequentially applying a predetermined number of bytes of aligned frame data, said first stage commands, and said first stage command data to first stage alteration engines includes the step of applying sixteen bytes of aligned frame data, sixteen of said first stage commands, and sixteen bytes of said first stage command data to sixteen byte-wise ALUs forming said first stage alteration engines.

14. A method for implementing frame header alterations in a network processor as recited in claim 13 wherein the step of sequentially applying first stage altered frame data outputs of said first stage alteration engines, said second stage commands and said second stage command data to second stage alteration engines for providing final altered frame data includes the step of sequentially applying sixteen bytes of said first stage altered frame data outputs of said first stage alteration engines, sixteen of said second stage commands and sixteen bytes of said second stage command data to second stage alteration engines for providing said final altered frame data.

15. A method for implementing frame header alterations in a network processor as recited in claim 14 includes the steps of sequentially providing sixteen bytes of said final altered frame data.

* * * * *